United States Patent
Sridhar et al.

(10) Patent No.: US 7,400,443 B1
(45) Date of Patent: Jul. 15, 2008

(54) METHOD AND APPARATUS FOR OPTICAL AMPLIFYING DEVICE GAIN CONTROL WITH GAIN THRESHOLD

(75) Inventors: Balakrishnan Sridhar, Ellicott City, MD (US); Jun Bao, Ellicott City, MD (US)

(73) Assignee: Ciena Corporation, Linthicum, MD (US)

( * ) Notice: Subject to any disclaimer, the term of this patent is extended or adjusted under 35 U.S.C. 154(b) by 370 days.

(21) Appl. No.: 10/716,609

(22) Filed: Nov. 20, 2003

Related U.S. Application Data

(60) Provisional application No. 60/427,741, filed on Nov. 20, 2002.

(51) Int. Cl.
*H04B 10/17* (2006.01)

(52) U.S. Cl. .............................. 359/341.41; 359/341.42

(58) Field of Classification Search ............ 359/341.41, 359/341.43
See application file for complete search history.

(56) References Cited

U.S. PATENT DOCUMENTS

| | | | | |
|---|---|---|---|---|
| 5,678,198 | A * | 10/1997 | Lemson | 455/67.11 |
| 5,995,274 | A * | 11/1999 | Sugaya et al. | 359/337 |
| 6,025,947 | A * | 2/2000 | Sugaya et al. | 398/97 |
| 6,038,063 | A * | 3/2000 | Tsuda et al. | 359/341.41 |
| 6,144,485 | A * | 11/2000 | Sugaya et al. | 359/337 |
| 6,288,836 | B1 * | 9/2001 | Kawasaki et al. | 359/341.42 |
| 6,417,965 | B1 * | 7/2002 | Ye et al. | 359/341.41 |
| 6,542,291 | B1 * | 4/2003 | Kinoshita et al. | 359/341.33 |
| 6,583,909 | B1 * | 6/2003 | Wada | 398/177 |
| 6,603,596 | B2 * | 8/2003 | Inagaki et al. | 359/341.4 |
| 6,631,026 | B2 * | 10/2003 | Kinoshita et al. | 359/341.33 |
| 6,747,790 | B2 * | 6/2004 | Onaka et al. | 359/337 |
| 6,903,324 | B2 * | 6/2005 | Tomofuji et al. | 250/214 LA |
| 6,977,770 | B2 * | 12/2005 | Komaki et al. | 359/337.11 |
| 6,977,771 | B2 * | 12/2005 | Asao et al. | 359/341.41 |
| 7,027,210 | B2 * | 4/2006 | Tian et al. | 359/333 |
| 2002/0001124 | A1 * | 1/2002 | Kinoshita et al. | 359/337.1 |
| 2002/0024723 | A1 * | 2/2002 | Sekiya et al. | 359/337.1 |
| 2002/0057491 | A1 * | 5/2002 | Dorgeuille et al. | 359/344 |
| 2002/0061738 | A1 * | 5/2002 | Simmons et al. | 455/234.1 |
| 2002/0093729 | A1 * | 7/2002 | Gerish et al. | 359/341.41 |
| 2002/0114066 | A1 * | 8/2002 | Nakaji | 359/341.41 |
| 2002/0176156 | A1 * | 11/2002 | Zahnley et al. | 359/341.4 |
| 2004/0042063 | A1 * | 3/2004 | Ohtani et al. | 359/341.3 |

* cited by examiner

*Primary Examiner*—Deandra M. Hughes
*Assistant Examiner*—Ari M Diacou
(74) *Attorney, Agent, or Firm*—Clements Bernard Miller; Christopher L. Bernard; Tyler S. Brown

(57) ABSTRACT

Optical amplifying method and apparatus are proposed. Constant gain amplifiers operate such that the output power of the amplifier generally tracks the input power. However, optical systems are not perfect and the input to the optical amplifier stage includes not only the desired signal, but also includes accumulated effects of the imperfections. The imperfections include losses of the fiber sections, variations in laser powers, and drifts. Thus, simple amplification not only amplifies the desired signal, but also amplifies accumulated imperfections. Such imperfections occur over time and are generally small in magnitude. By operating the amplifier such that amplification of small variations is suppressed while allowing for tracking of large input variations, amplifying the accumulated imperfections is minimized.

17 Claims, 7 Drawing Sheets

METHOD AND APPARATUS FOR OPTICAL AMPLIFYING DEVICE GAIN CONTROL WITH GAIN THRESHOLD

PROVISIONAL APPLICATION

The present application claims priority under 35 U.S.C. § 119(e) of a provisional application 60/427,741, filed on Nov. 20, 2002 the entirety of which is hereby incorporated by reference.

FIELD OF THE INVENTION

The field of the invention generally relates to optical amplifying devices. More particularly, the invention relates to optical amplifying devices and methods with gain control.

BACKGROUND OF THE INVENTION

Conventional optical amplifiers may be operated under variable control to achieve an amplifier response that is flat over a wide gain range. Amplifiers may also be operated in constant gain mode in which the pumps are controlled such that the amplifier gain is constant with the result being that the output power closely tracks the input power.

In optical systems, it is desirable to launch a constant power per channel into the fiber. This may be achieved by operating the amplifier in a constant gain mode. In constant gain mode, any change in the input power of a constant gain amplifier produces a proportional change in the output power of the amplifier. Thus any change in the input due to change in channel count (i.e. addition and deletion of channels), will cause a proportional change in the output power of the amplifier, keeping the per channel launch power nominally constant.

While this method is useful for tracking changes in channel count, there are drawbacks. The amplifier has no means of differentiating between changes in input power caused by channel count changes and other events such as change in fiber loss, component losses etc. While these changes may be small over a single span, these changes will accumulate along multiple sections of fibers and amplifiers to a detrimental effect.

Consider a chain 100 of optical amplifiers 102-X shown in the block diagram of FIG. 1. The input power per channel to the first amplifier 102-1 is P1. The average losses of the fiber sections 104-1 to 104-N are shown as $L_1, L_2, \ldots L_N$. If the launch power per channel is assumed to be same at each fiber section (and same as at the output of the first amplifier), the gains $G_2, \ldots G_N$ of the amplifiers 102-2 $\ldots$ 102-N track the average loss of the fiber section preceding the amplifier ($L_1, L_2 \ldots L_N$). The time dependent variation in fiber loss given by $\Delta L_1, \Delta L_2, \ldots \Delta L_N$ and the variation in input power is assumed to be $\Delta P_1$.

As noted above, conventional optical amplifiers operate in a simple constant gain mode. In this case, the control circuitry keeps the gain of the amplifier at target value $G_{CG}$. A control mechanism for the conventional amplifier in constant gain mode is shown in the flow chart 200 of FIG. 2. In FIG. 2, $P_{in}$ is the input power to an amplifier, and $P_{out}$ is the output power from the amplifier. It is assumed that the power values are in a logarithmic scale for ease of calculation.

In step 210, the target gain $G_{CG}$ for the amplifier is set. This value is provisioned in the constant gain mode and typically corresponds to the gain of a particular stage or multiple stages of the chain of amplifiers. In step 220, input and output powers $P_{in}$ and $P_{out}$ are measured and the actual gain $G_{meas}$ is calculated from the measured power values. Step 230 determines whether or not a deviation $G_{error}$ from the target gain $G_{CG}$ exists. If so, the amplifier's output $P_{out}$ is adjusted by $G_{error}$ in step 240 and the method returns to step 220. If the deviation is determined not to exist in step 230, the output is not adjusted and the method returns to step 220.

FIG. 3 graphically illustrates the tracking of the output power of the amplifier as a function of the input power. The amplifier is assumed to be operating at a target set gain of 25 dB. As shown, the output power of the amplifier tracks the input as closely as possible.

It can be seen that substantial output power variations occur if the constant gain control is utilized. Such power fluctuations accumulate over a chain of amplifiers to a detrimental effect as pointed out above.

BRIEF DESCRIPTION OF THE DRAWINGS

Features of the present invention will become more fully understood to those skilled in the art from the detailed description given hereinbelow with reference to the drawings, which are given by way of illustrations only and thus are not limitative of the invention, wherein.

DETAILED DESCRIPTION

For simplicity and illustrative purposes, the principles of the present invention are described by referring mainly to exemplary embodiments thereof. The same reference numbers and symbols in different drawings identify the same or similar elements. Also, the following detailed description does not limit the invention. The scope of the invention is defined by the claims and equivalents thereof.

As noted previously, a simple constant gain mode amplifier amplifies not only the desired input signal, but also amplifies the accumulated imperfections of the optical system.

Such imperfections in the input signal generally occur slowly over time and typically are low in magnitude (also known as signal drift or simply "drift"). For example, variations in span losses and variation in laser powers used for inputting signals to the amplifiers can occur due to polarization dependence of optical components. Also, mechanical and/or thermal effects can cause time dependent loss variations in optical fibers. Another source of noise that can couple into the system include any noise that can couple into the amplifier pump electronics and consequently into the amplifier output.

While all of these variations are usually fairly small, it is desirable that these variations are squelched at each amplifier and not allowed to accumulate along the system. For example, in order to minimize any noise coupling into the pump, it is desirable to operate the pumps using a constant current drive for the pumps.

Figure 1:
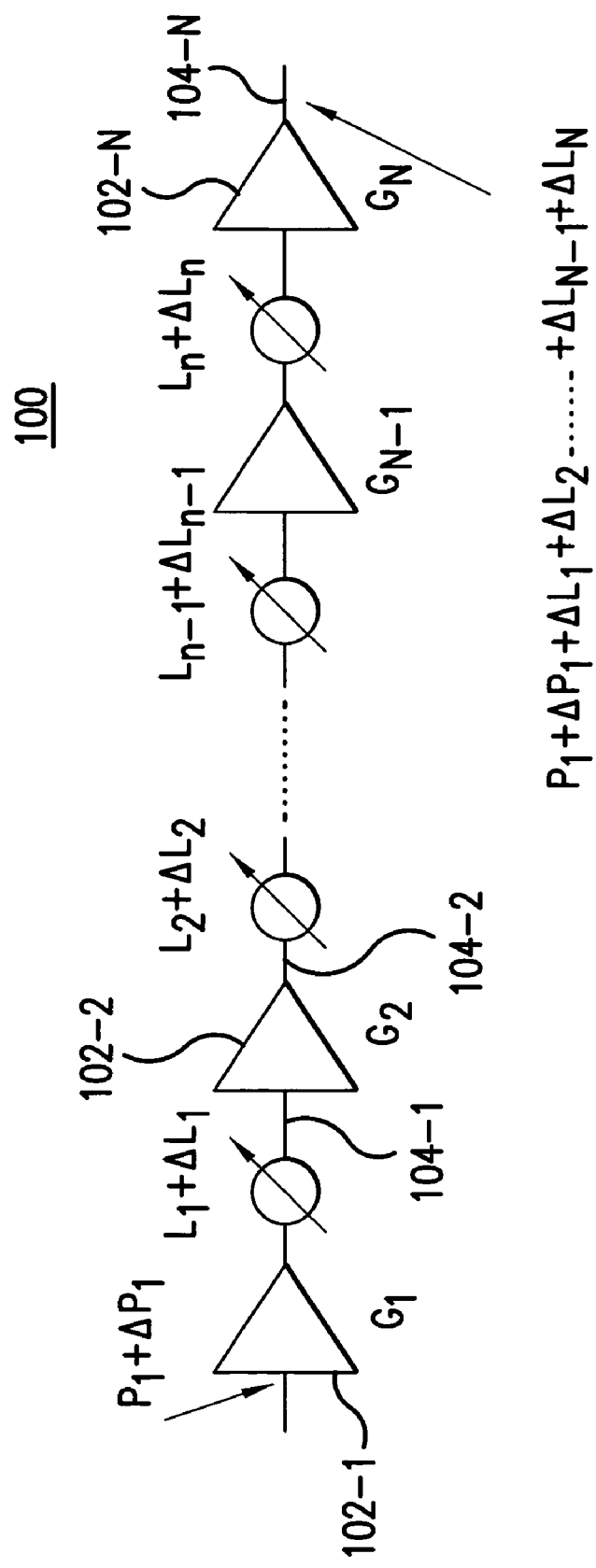
FIG. 1 is a block diagram illustrating a chain of conventional constant gain mode optical amplifiers.
Figure 2:
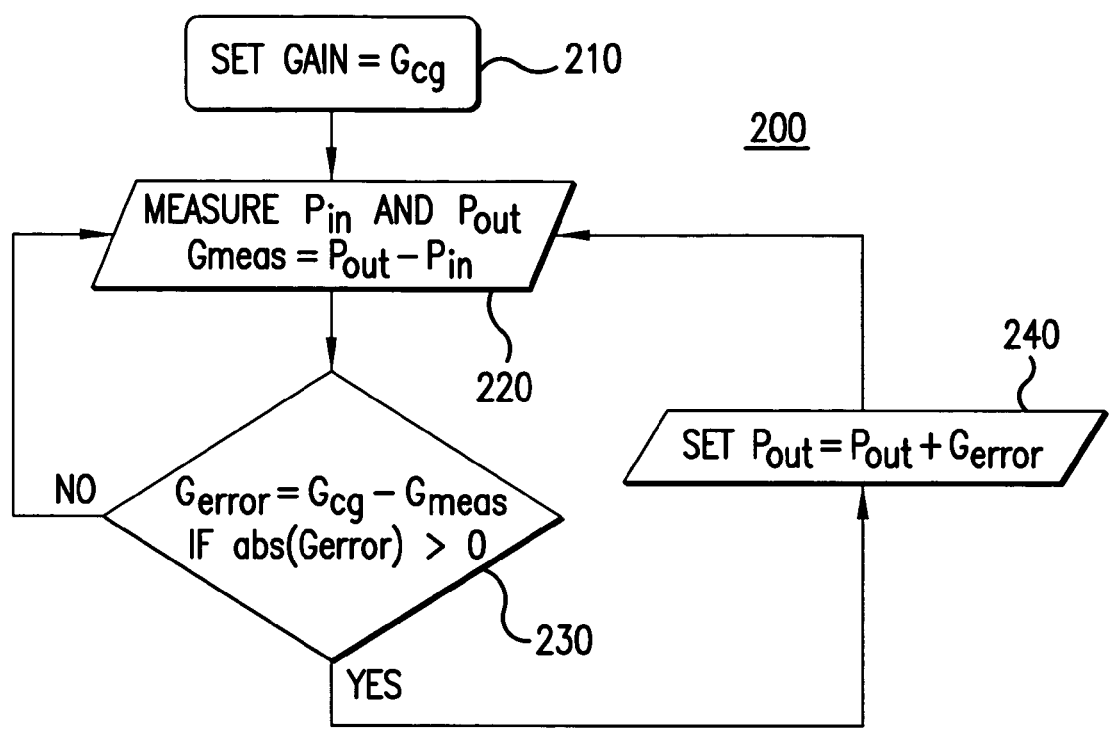
FIG. 2 is a flow chart illustrating a control mechanism of a conventional constant gain optical amplifier.
Figure 3:
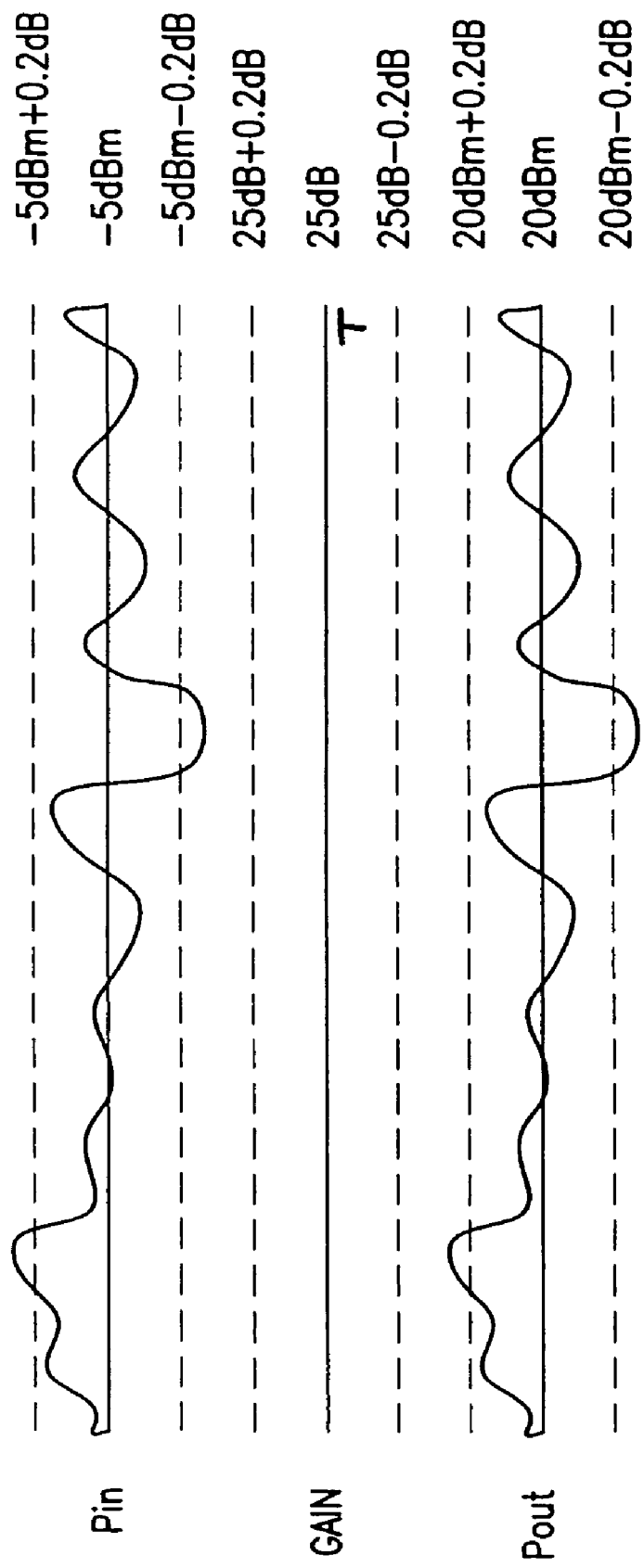
FIG. 3 is a graphical illustration of tracking of input to output of a conventional constant gain optical amplifier.
Figure 4:
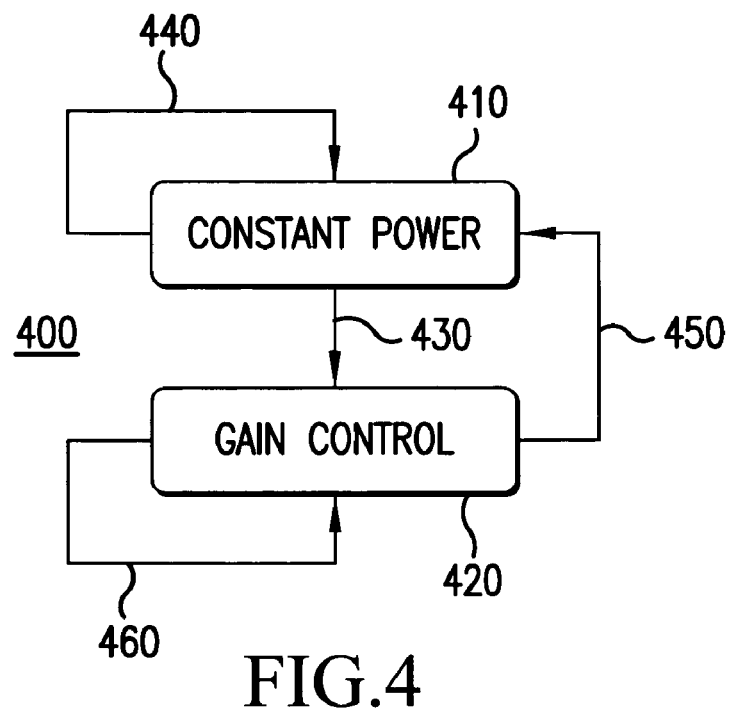
FIG. 4 is a block diagram illustrating an exemplary control mechanism of an optical amplifying device according to an embodiment of the present invention.

FIG. 4 is a high level block diagram 400 of a control mechanism of an exemplary optical amplifying device of the present invention. As shown, the optical amplifying device operates in one of two modes—constant power mode 410 (gain threshold mode) or constant gain mode 420 (gain control mode). The explanation is as follows.

As noted above, variations in the power of the input to the amplifying device that is relatively small in magnitude are more likely due to the imperfections in the system rather than variations in the actual input signal. In this type of a situation, it is desired that the amplifying device be suppressed from reacting to the input variations. By operating the optical amplifying device in the constant power mode 410, the suppression may be achieved. In the above constant power mode can mean both constant output power or constant pump power (by delivering constant pump current to pumps). For example, natural erbium doped fiber amplifier (EDFA) behavior may be utilized to suppress any low frequency, low magnitude changes to the input.

Conversely, large variations in power are more likely due to the changes in the actual input signal itself. For example, adding or dropping channels of a wavelength division multiplexed (WDM) signal will typically cause a large power variation. Switching operations may cause large power variation as well. Under this type of a circumstance, it is desired that the amplifying device track the input. By operating the optical amplifying device in the constant gain mode 420, tracking may be achieved.

The optical amplifying device may switch from one mode to another appropriately through the use of a gain threshold. For example, assume that the optical amplifying device is currently operating in the constant power mode 410. An actual gain $G_{MEAS} = P_{OUT} - P_{IN}$ may be determined from the output and input powers of the amplifying device. Then, the gain error $G_{ERROR} = G_{CG} - G_{MEAS}$ (where $G_{CG}$ is the target gain) may be determined. If the absolute value of $G_{ERROR}$ exceeds a predetermined threshold value $G_{TH}$, i.e. if $|G_{ERROR}| - G_{TH} > 0$, then the amplifying device may switch to the constant gain mode 420 (arrow 430 in FIG. 4). Otherwise, the amplifying device may remain in the constant power mode 410 (arrow 440). The constant power mode 410 may also be described as constant power with gain threshold mode or simply "gain threshold mode."

In an embodiment of the present invention, the optical amplifying device operates in constant gain mode 420 for a brief lock out period (10 seconds for example) and returns to back to gain threshold (CP) mode 410. It should be noted that the lock out period may be set at any period appropriate for the situation.

If no transient events occur during the lock out period, then the optical amplifying device may be switched to operate in the gain threshold mode (i.e. gain threshold can be re-enabled) 410 (arrow 450). In an embodiment, the transient event may be defined as the output power of the amplifying device deviating from a reference power level by more than a preset amount within prescribed time, such as the lock out period. In another embodiment, the transient event may be defined as the level of the output power fluctuating by more than a preset amount within the prescribed time. In general, the transient event is an indication that the output of the amplifying device is in a state of flux and the optical system has not reached a desired stability.

If one or more transient events do occur, which indicates that the optical system has not stabilized, then the lock out period may be reset and the optical amplifying device may remain in the constant gain mode 420 (arrow 460).

Other criteria can also be used to return the optical amplifying device to the gain threshold mode. For example, instead of detecting transient events as described above, an alternative may be simply set the lock out at a "long enough" period and return to the gain threshold mode after the lock out period without regard to transient events occurring. However, it is preferred that the optical amplifying device be returned to the gain threshold mode after determining that the optical system has stabilized.

Figure 5:
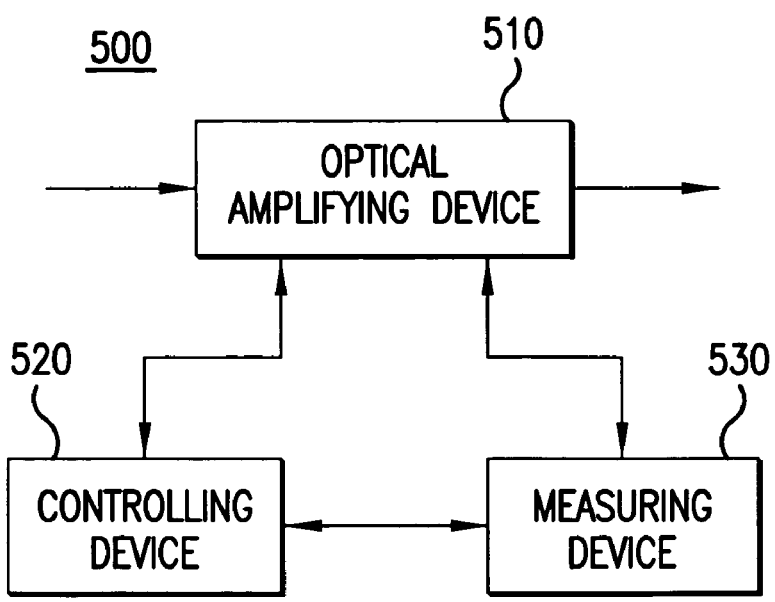
FIG. 5 is a block diagram of an optical amplifying device according to an embodiment of the present invention.

FIG. 5 is a block diagram of an optical amplifying apparatus 500 according to an embodiment of the present invention. The apparatus includes an optical amplifying device 510, a controlling device 520, and a measuring device 530. The optical amplifying device 510 receives input signal and outputs an output signal. The measuring device 530 is configured to measure power levels on a plurality of points within the optical amplifying device 510 including input and output power levels $P_{IN}$ and $P_{OUT}$. Both the optical amplifying device 510 and the measuring device 530 communicate with the controlling device 520.

The controlling device 520 controls the operation of the optical amplifying device 510 based on the power levels measured by the measuring device 530. The controlling device 520 controls the optical amplifying device 510 to operate either in the gain threshold mode (410 of FIG. 4) or the constant gain mode (420 of FIG. 4).

As an example, in the gain threshold mode, the controlling device 520 calculates the actual gain of the optical amplifying device 510 based on the input and output power levels $P_{IN}$ and $P_{OUT}$—more specifically, the gain may be determined as $P_{OUT} - P_{IN}$ (logarithmic scale). If the absolute value of the gain error does not exceed a preset threshold, then the controlling device 520 adjusts the gain of the optical amplifying device 510 so that output power level $P_{OUT}$ is substantially equal to a preset level.

In the constant gain mode, the controlling device 520 determines whether or not a transient event occurred within a lock out period. If so, the controlling device 520 continues to operate the optical amplifying device 510 in the constant gain mode and resets the lock out period.

The controlling device 520 also switches the mode as necessary. As an example, the controlling device 520 switches the operation of the optical amplifying device 510 from the gain threshold mode to the constant gain mode when the absolute value of the gain error of the optical amplifying device 510 exceeds the preset gain threshold. The controlling device 520 switches the operation from the constant gain mode to the gain threshold mode if it determines that no transient event occurs within the lock out period.

Figure 6:
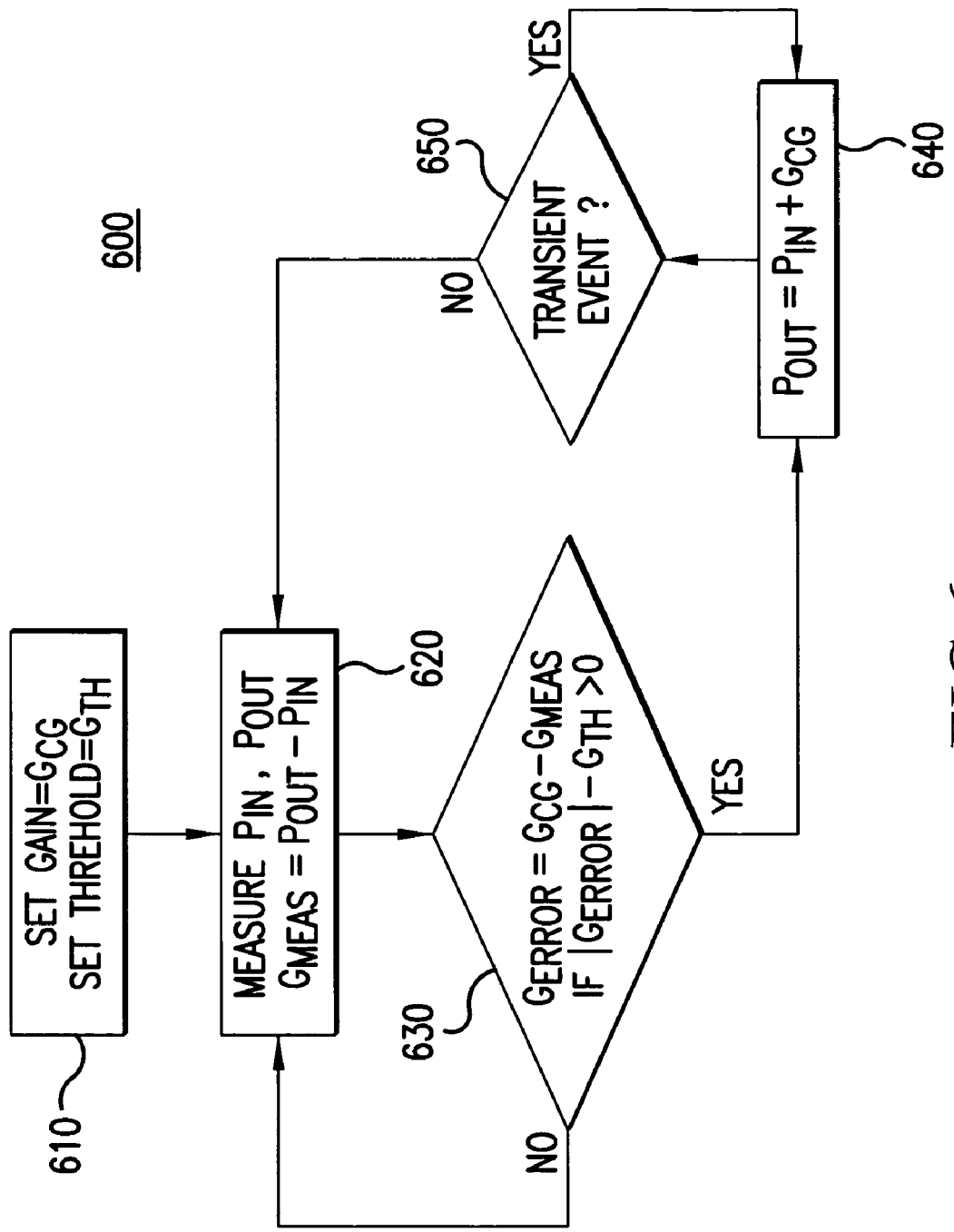
FIG. 6 is a flow chart illustrating an exemplary control mechanism of an optical amplifying device according to an embodiment of the present invention.

FIG. 6 is a flow chart illustrating an exemplary control mechanism of an optical amplifying device according to an embodiment of the present invention. In step 610, target gain $G_{CG}$ and threshold gain $G_{TH}$ are set. In step 620, the optical amplifying device enters the gain threshold mode. In this step, input and output powers $P_{IN}$ and $P_{OUT}$ are measured and the gain $G_{MEAS} = P_{OUT} - P_{IN}$ is determined. In step 630, the gain error $G_{ERROR} = G_{CG} - G_{MEAS}$ is determined and compared against the threshold gain $G_{TH}$.

If the absolute value of the gain error $G_{ERROR}$ exceeds the threshold gain $G_{TH}$, then the constant gain mode is entered (see step 640). In step 640, the input power $P_{IN}$ the optical amplifying device is appropriately amplified by $G_{CG}$ and output as $P_{OUT}$. The optical amplifying device remains in the constant gain mode as long as one or more transient events occur within a preset lock out period as described above (see step 650). If no transient event occurs within the lock out period, then the optical amplifying device enters the gain threshold mode (see step 620).

If the absolute value of the gain error $G_{ERROR}$ is within the threshold gain $G_{TH}$ in step 630, then the optical amplifying device remains in the gain threshold mode.

Figure 7:
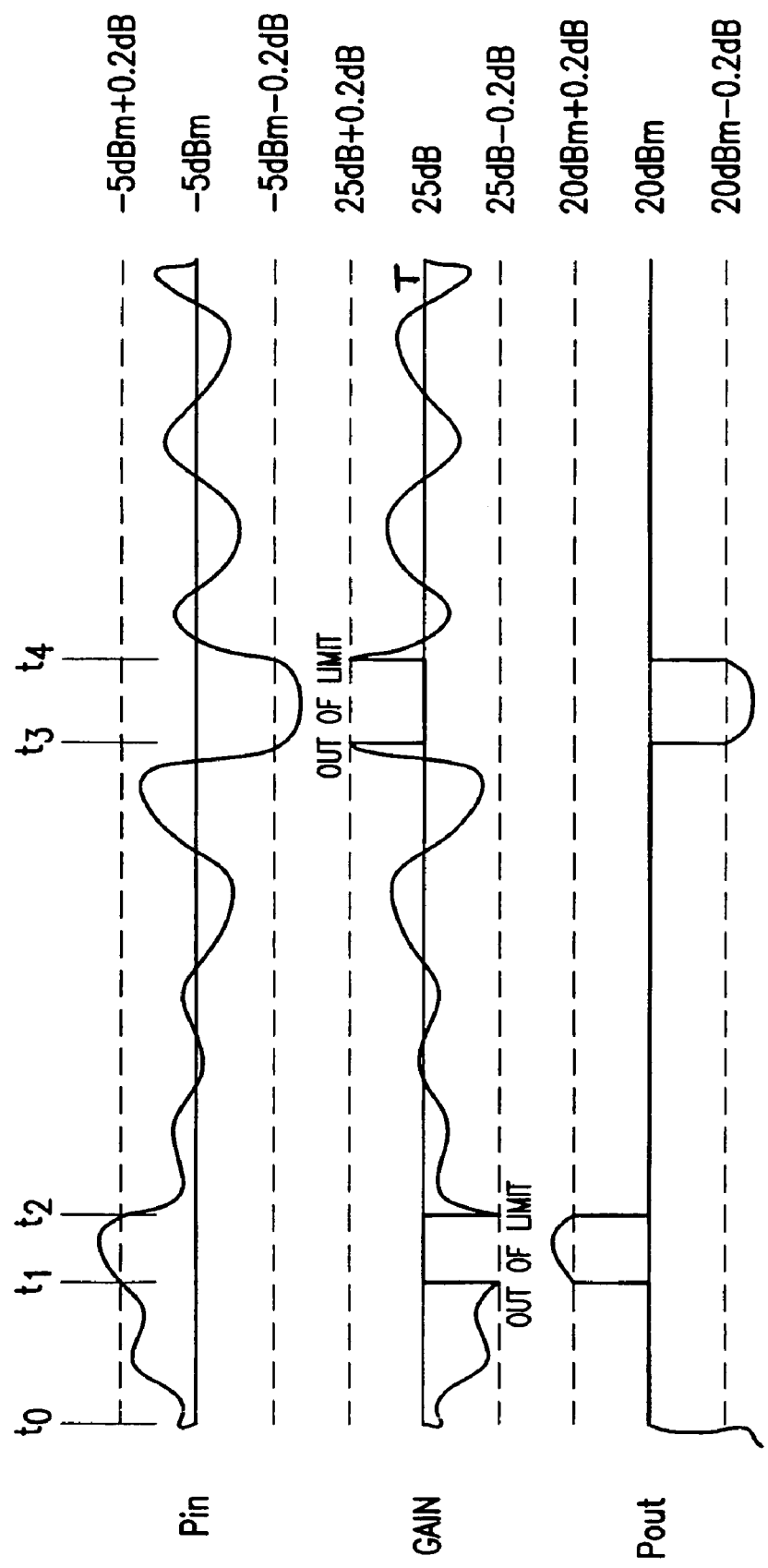
FIG. 7 is an exemplary graphical illustration of power output of an optical amplifying device according to an embodiment of the present invention.

FIG. 7 is an exemplary graphical illustration 700 of power output of an optical amplifying device utilizing the gain threshold described above. In this non-limiting example, the target gain $G_{CG}$ for the amplifying device is set at 25 dB and the gain threshold $G_{TH}$ is set at 0.2 dB. It should be noted that the target gain $G_{CG}$ and the gain threshold $G_{TH}$ are not limited to the above values and may be set to any values as deemed appropriate.

In the gain threshold mode, for example between time $t_0$ and $t_1$, the gain of the optical amplifying device varies according to the input power so that the output power $P_{OUT}$ is substantially constant.

When the absolute value of the gain error $G_{ERROR}$ exceeds the threshold $G_{TH}$, i.e. when $|G_{ERROR}|-G_{TH}>0$ becomes true, the optical amplifying device enters the constant gain mode, for example between times $t_1$ and $t_2$ and between times $t_3$ and $t_4$. During these times, the output power $P_{OUT}$ is appropriately amplified as shown.

Assuming no transient events occur, the optical amplifying device reenters gain threshold mode, for example between times $t_2$ and $t_3$ and beyond time $t_4$.

As shown, during gain threshold mode, the gain is adjusted to provide the output power $P_{OUT}$ at a substantially constant level. During the constant gain mode, the gain is kept substantially constant so that output power $P_{OUT}$ tracks the input power $P_{IN}$.

Figure 8:
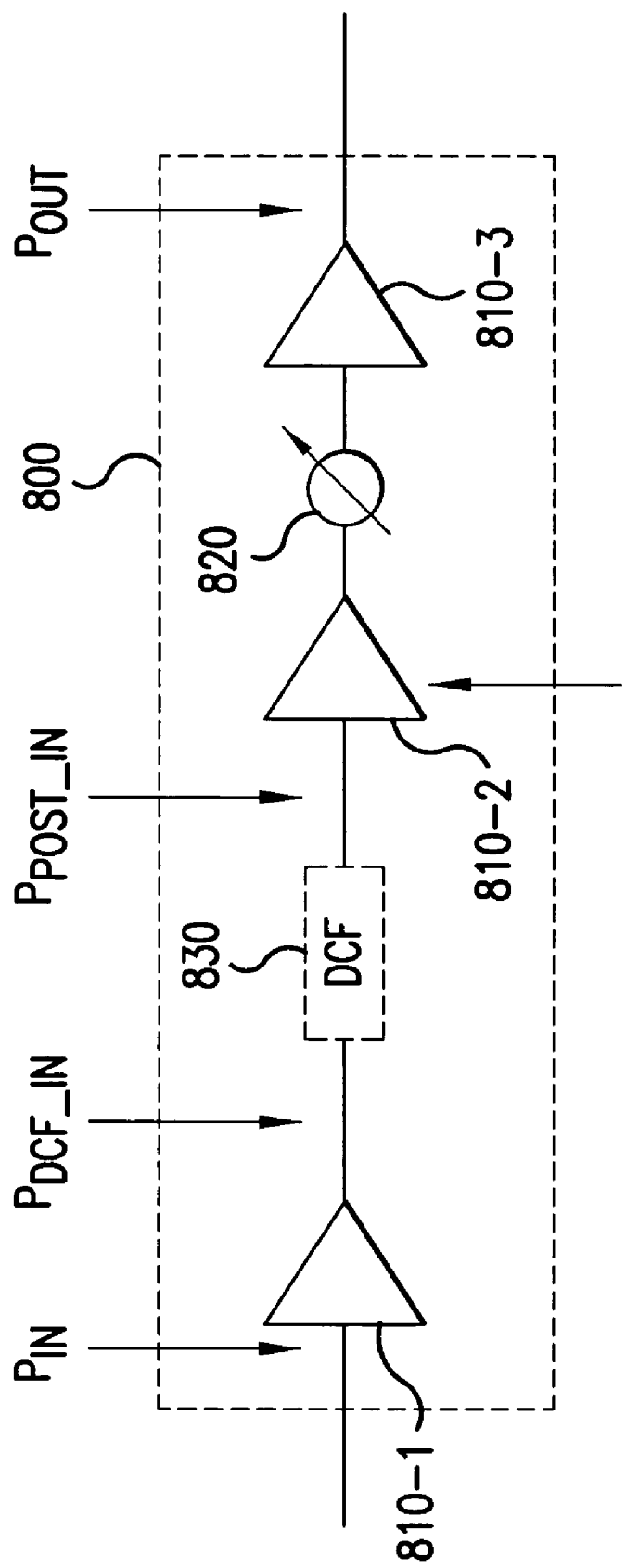
FIG. 8 is a block diagram of an EDFA optical amplifying device according to an embodiment of the present invention.

An optical amplifying devices may include a service channel, one or more variable optical attenuators (VOA), signal monitors, optical monitors, input isolator, output isolator, output back reflection monitor, gain flattening filter, pumps, on-board electrical control circuits including communication port, etc. FIG. 8 is a block diagram of a three stage optical amplifying device 800 according to an embodiment of the present invention. For example, the amplifying device 800 may include EDFA amplifiers. Of course, it should be noted that the EDFA is but one of several amplifiers made of optically active materials that may be used. In addition, erbium doped waveguide amplifier (EDWA) may be used as well.

The device 800 includes various power monitoring points as shown that are monitored by the measuring device (see FIG. 5). The device 800 may include first, second, and third optical amplifier stages 810-1, 810-2, and 810-3 connected in series fashion. The device 800 may also include a VOA 820 and connected as shown. The VOA 820 may be manipulated to control the gain of the device 800. While not shown, it should be noted that other VOAs may be added to finely tune the operation of the device 800.

The device 800 may also include an optional dispersion compensation fiber (DCF) 830. The DCF is desirable to provide periodic dispersion compensation for high frequency signals, typically 10 Gb/s or higher.

In general, an optical amplifying device may include a plurality of amplifier stages connected in series, one or more VOAs connected in series with the plurality of optical amplifier stages such that each VOA receives an output of one optical amplifier and outputs to a next optical amplifier. At least least one VOA is controlled by the controlling device. In addition, the optical amplifying device may include one or more DCFs, with each DCF receiving an output of an amplifier and outputting to a next amplifier.

A simpler implementation of an optical amplifying device would include one or more amplifier stages and a VOA. The gain of the amplifier may be controlled by adjusting the VOA. Alternatives include adjusting power supplied by the pump(s) and by controlling other VOA(s) of the amplifier.

While the invention has been described with reference to the exemplary embodiments thereof, it is to be understood that various modifications may be made to the described embodiments without departing from the spirit and scope of the invention thereof. The descriptions used herein are set forth by way of illustration only and are not intended as limitations.

What is claimed is:

1. An optical amplifying apparatus, comprising:
an optical amplifying device operating in one of a gain threshold mode and a constant gain mode, wherein the gain threshold mode is configured to deliver one of constant output power and constant pump power to suppress relatively small in magnitude input power variations, and wherein the constant gain mode is configured to track input power due to relatively large in magnitude input power variations;
a controlling device configured for operating said optical amplifying device in one of the gain threshold mode and the constant gain mode responsive to input power and output power to the optical amplifying device, said controlling device further configured for switching the optical amplifying device from operating in the gain threshold mode to operating in the constant gain mode when an absolute value of a gain error exceeds a gain threshold, wherein the gain error is a difference between a target gain and a gain of the optical amplifying device, wherein the gain comprises the difference between input and output power measured by a measuring device, said controlling device further configured for switching the optical amplifying device back and forth between the gain threshold mode and the constant gain mode utilizing a control loop, and said controlling device further configured for switching the optical amplifying device from the constant gain mode to the gain threshold mode when no transient events occur during a lockout period; and
said measuring device configured to measure power levels on a plurality of points within said optical amplifying device including at least an input power ($P_{IN}$) and an output power ($P_{OUT}$) of the optical amplifying device, said measuring device also configured to communicate with said controlling device to provide said input power and output power for the control loop.

2. The apparatus of claim 1, wherein at least one of the gain threshold and the target gain are predetermined.

3. The apparatus of claim 1, wherein said optical amplifying device comprises:
a plurality of optical amplifier stages connected in series, wherein an input of a first optical amplifier stage is an input of said amplifying device; and
one or more variable optical attenuators (VOA) connected in series with said optical amplifier stages such that each VOA receives an output of one optical amplifier stage and outputs to a next optical amplifier stage, wherein at least one VOA is controlled by said controlling device, wherein said measuring device is further configured to measure power levels on a plurality of points along a connected chain of said plurality of optical amplifier stages and VOAs.

4. The apparatus of claim 3, wherein said optical amplifying device further comprises one or more dispersion compensation fibers (DCF) connected in series with said optical amplifier stages and said VOAs such that each DCF receives an output of the optical amplifier stage and outputs to the next optical amplifier stage.

5. The apparatus of claim 3, wherein in the gain threshold mode, said controlling device is configured for:
calculating the gain of the optical amplifying device based on $P_{IN}$ and $P_{OUT}$;
adjusting the gain such that $P_{OUT}$ is substantially equal to a predetermined level of power when the absolute value of the gain error does not exceed the predetermined gain threshold.

6. The apparatus of claim 1, when operating in the constant gain mode, wherein said controlling device is further configured for switching said optical amplifying device to operate in the gain threshold mode after a predetermined period of time has passed.

7. The apparatus of claim 3, wherein in the constant gain mode, said controlling device is configured for:
detecting whether or not a transient event occurred within a predetermined lock out period;
switching the optical amplifying device to operate in the gain threshold mode if the transient event has not been detected within the lock out period; and
resetting the lock out period and leaving optical amplifying device to operate in the constant gain mode if the transient event has been detected within the lock out period.

8. The apparatus of claim 7, wherein the transient event is one of:
the output power of said optical amplifying device deviating from a reference power level by more than a predetermined difference amount; and
a level of output power of said optical amplifying device fluctuating by more than a predetermined fluctuation amount.

9. The apparatus of claim 1, wherein said optical amplifying device comprises:
first, second, and third optical amplifier stages connected in series, wherein an input of the first optical amplifier stage is an input of said optical amplifying device; and
a variable optical attenuator connected between said first and second optical second amplifier stages, said variable optical attenuator configured to be controlled by said controlling device for controlling gain of said optical amplifying device,
wherein said measuring device is configured to measure power levels at input to said first optical amplifier stage ($P_{IN}$) output of said third optical amplifier stage ($P_{OUT}$).

10. The apparatus of claim 9, wherein in the gain threshold mode, said controlling device is configured for:
calculating the gain of the optical amplifying device based on $P_{IN}$ and $P_{OUT}$;
adjusting the gain such that $P_{OUT}$ is substantially equal to a predetermined level of power when the absolute value of the gain error does not exceed the predetermined gain threshold.

11. The apparatus of claim 10, wherein in the constant gain mode, said controlling device is further configured for resetting a lock out period and leaving optical amplifying device to operate in the constant gain mode if the transient event has been detected within the lock out period.

12. The apparatus of claim 11, wherein the transient event is one of:
the output power of said optical amplifying device deviating from a reference power level by more than a predetermined difference amount; and
a level of output power of said optical amplifying device fluctuating by more than a predetermined fluctuation amount.

13. The apparatus of claim 11, wherein the calculated gain is the ratio of $P_{OUT}$ to $P_{IN}$ and the gain of the optical amplifying device is adjusted by adjusting a gain of said VOA in response to the calculated gain.

14. The apparatus of claim 9:
wherein said optical amplifying device further comprises a dispersion compensation fiber (DCF) connected in series in between said first and second optical amplifier stages,
wherein said measuring device is further configured to measure power levels at output of said first optical amplifier stage ($P_{PRE\_OUT}$), input to said DCF ($P_{DCF\_IN}$), and output of said DCF ($P_{POST\_IN}$).

15. The apparatus of claim 9, when operating in the constant gain mode, wherein said controlling device is further configured for switching said optical amplifying device to operate in the gain threshold mode after a predetermined period of time has passed.

16. The apparatus of claim 9, wherein in the constant gain mode, said controlling device is configured for:
detecting whether or not a transient event occurred within a predetermined lock out period;
switching the optical amplifying device to operate in the gain threshold mode if the transient event has not been detected within the lock out period; and
resetting the lock out period and leaving optical amplifying device to operate in the constant gain mode if the transient event has been detected within the lock out period.

17. The apparatus of claim 16, wherein the transient event is one of:
the output power of said optical amplifying device deviating from a reference power level by more than a predetermined difference amount; and
a level of output power of said optical amplifying device fluctuating by more than a predetermined fluctuation amount.

* * * * *